United States Patent [19]

Hilfman et al.

[11] 3,956,104

[45] May 11, 1976

[54] HYDROCRACKING PROCESS

[75] Inventors: Lee Hilfman, Mount Prospect;
Edward Michalko, Chicago, both of Ill.

[73] Assignee: Universal Oil Products Company, Des Plaines, Ill.

[22] Filed: Aug. 9, 1974

[21] Appl. No.: 496,241

[52] U.S. Cl. .............................. 208/111; 252/455 Z; 252/458
[51] Int. Cl.² ..................... C10G 13/02; B01J 29/12
[58] Field of Search ..................................... 208/111

[56] References Cited
UNITED STATES PATENTS

| | | | |
|---|---|---|---|
| 3,562,345 | 2/1971 | Mitsche | 260/672 |
| 3,607,043 | 9/1971 | McDaniel et al. | 208/120 X |
| 3,798,177 | 3/1974 | Reed et al. | 252/455 R |

*Primary Examiner*—Delbert E. Gantz
*Assistant Examiner*—G. E. Schmitkons
*Attorney, Agent, or Firm*—James R. Hoatson, Jr.; Robert W. Welch; William H. Page, II

[57] ABSTRACT

A process for converting a hydrocarbon charge stock into lower boiling, normally liquid hydrocarbon products which comprises reacting said charge stock and hydrogen at hydrocracking conditions in contact with a catalyst comprising an alumina-crystalline aluminosilicate composite, a Group VIB metal component and a Group VIII metal component. The catalyst is characterized by a method of preparation.

7 Claims, No Drawings

HYDROCRACKING PROCESS

It is well known that cracking involves the thermal decomposition of petroleum, or heavy petroleum fractions, to yield lower boiling more useful products. When the cracking operation is effected under an imposed hydrogen pressure, the process is referred to as hydrocracking, and the products are substantially more saturated than would otherwise be the case. Hydrocracking is particularly useful to convert those petroleum hydrocarbon fractions boiling in the middle distillate range to more useful lower boiling products usually comprising hydrocarbons in the gasoline boiling range.

Although hydrocracking can be effected thermally, catalysts offer a substantial improvement. The cataylst will typically comprise a cracking component, for example, silica, alumina, silica-alumina, or other acid-acting refractory inorganic oxide, and a hydrogenation component, usually a metal of Group VIB and/or Group VIII. Hydrocracking catalysts containing a crystalline aluminosilicate dispersed in the acid-acting refractory inorganic oxide have been shown to be particularly effective in the hydrocracking process.

It is generally recognized that catalyst is a mechanism particularly noted for its unpredictable nature. Minor variations in a method of manufacture often result in an unexpected improvement in the catalyst product with respect to a given hydrocarbon conversion reaction. The improvement may be the result of an undetermined alteration in the physical character and/or composition of the catalyst product difficult to define and apparent only as a result of the unexpected improvement in the catalyst activity, selectivity and/or stability. For example, it has been found that the activity of a hydrocracking catalyst is dependent not only on the acid-acting refractory inorganic oxide selected, but also on the method of dispersing the crystalline aluminosilicate therein.

In one of its broad aspects, the present invention embodies a process for converting a hydrocarbon feed stock into lower boiling, normally liquid hydrocarbon products which comprises reacting said charge stock and hydrogen at hydrocracking conditions in contact with a catalyst comprising an alumina-crystalline aluminosilicate composite, a Group VIB metal component and a Group VIII metal component, said catalyst being characterized by a method of preparation which comprises admixing ammonium hydroxide and aluminum sulfate in aqueous media in a ratio to effect a soluble partial hydrolysis product of said aluminum sulfate; commingling a crystalline aluminosilicate with the partial hydrolysis product; thereafter effecting complete hydrolysis of said aluminum sulfate; aging the resulting mixture for a period of at least about 2 hours; separating and washing the solids product free of soluble matter; impregnating the solids product with a metal of Group VIB and a metal of Group VIII; and calcining the resulting composite at a temperature of from about 1100° to about 1700°F.

Other objects and embodiments of this invention will become apparent in the following detailed specification.

The hydrocarbon charge stock subject to hydrocracking in accordance with the process of this invention is suitably a petroleum hydrocarbon fraction boiling in the range of from about 400° to about 1200°F. Pursuant to the present process, the hydrocarbon charge stock is reacted with hydrogen at hydrocracking conditions including a hydrogen pressure of from about 500 to about 3000 psig and a temperature of from about 500° to about 1000°F.

Petroleum hydrocarbon fractions which can be utilized as charge stocks thus include the gas oils, fuel oils, kerosine, etc., recovered as distillate in the atmospheric distillation of crude oils, also the light and heavy vacuum gas oils resulting from the vacuum distillation of the reduced crude, the light and heavy cycle oils recovered from the catalytic cracking process, light and heavy coker gas oils resulting from low pressure coking, coal tar distillates and the like. Residual oils, often referred to as asphaltum oil, liquid asphalt, black oil, residuum, etc., obtained as liquid or semi-liquid residues after the atmospheric or vacuum distillation of crude oils, are operable in this process although it may be desirable to blend such oils with lower boiling petroleum hydrocarbon fractions for economical operation. The petroleum hydrocarbon charge stock may boil substantially continuously between about 400° and about 1200°F. or it may consist of any one, or a number of petroleum hydrocarbon fractions, such as are set out above, which distill over within the 400°–1200°F. range.

Since the petroleum hydrocarbons which are hydrocracked according to the process of this invention boil over a considerably wide range, it may be readily perceived that suitable reaction temperatures will lie within a correspondingly wide range, the preferred temperature ranges depending in each instance upon the particular petroleum hydrocarbon fraction utilized as a charge stock. For example, reaction temperatures of from about 500° to about 1000°F. are generally operable. However, where the particular petroleum hydrocarbon fraction utilized boils within the range of from about 700° to about 900°F., it is preferred to operate at reaction temperatures in the more restricted range of from about 500° to about 700°F.

Hydrogen is reacted with the hydrocarbon charge stock at a pressure of from about 500 psig to about 3000 psig, or preferably at from about 1200 psig to about 2000 psig. The ratio of hydrogen to the hydrocarbon charge stock is from about 2000 standard cubic feet to about 15,000 standard cubic feet per barrel of charge stock although amounts of from about 1000 standard cubic feet to as much as 30,000 standard cubic feet per barrel are operable. The liquid hourly space velocity of the petroleum hydrocarbon charge stock can be from about 0.25 to about 10 depending on the particular charge employed and the reaction temperatures necessitated thereby. A suitable correlation between space velocity and reaction temperature can be readily determined by one skilled in the art in any particular instance. When utilizing a charge stock boiling in the range of from about 700° to about 900°F., a liquid hourly space velocity of from about 1.0 to about 3.0 is preferred.

In the manufacture of the catalyst of this invention, ammonium hydroxide is admixed with aluminum sulfate in aqueous media in a ratio to effect a soluble partial hydrolysis product of said aluminum sulfate. Partial hydrolysis of the aluminum sulfate is suitably accomplished by commingling ammonium hydroxide and aluminum sulfate in a mole ratio of about 4:1 and stirring the same together until a solution is obtained. The partial hydrolysis is conveniently effected in aqueous solution, usually by the addition of a dilute aqueous ammonium hydroxide solution to dilute aqueous solution of aluminum sulfate. The partial hydrolysis product herein contemplated may be described as aluminum sulfate wherein two of the three sulfate radicals have been replaced with hydroxyl radicals. However, it may very well be that the partial hydrolysis product exists as a chemical complex which nevertheless comprises a ratio of about 2 hydroxyl radicals per aluminum ion present. In any case, the partial hydrolysis product of this invention is unique with respect to aluminum sulfate and the other hydrolysis products thereof in that it exists in solution at a pH of about 4.0 ±.2, and by virtue of its acquired hydroxy substituents, becomes chemically bound to the hereinafter described crystalline aluminosilicate in a fixed relationship prior to gelation to give a more uniformly catalyst composition. It will be appreciated that a selected hydrolysis as herein contemplated is best effected under conditions of rapid stirring and intimate contact of the reactants. Of particular importance to the present invention is the fact that the partial hydrolysis product can be commingled with the crystalline aluminosilicate as an alumina source at a higher pH than is normally the case.

Pursuant to the present invention, a crystalline aluminosilicate is commingled with the described aluminum sulfate partial hydrolysis product after which the hydrolysis is completed. Crystalline aluminosilicates are well known in the art and descriptions thereof have been published in considerable detail. In general, as found in nature or synthetically prepared, they comprise silica, alumina and one or more exchangeable cations such as sodium. They are characterized by a three-dimensional network of fundamental structural units consisting of silicon-centered $SiO_4$ and aluminum-centered $AlO_4$ tetrahedra interconnected through a mutual sharing of the apical oxygen atoms. To effect a chemical balance, each $AlO_4$ tetrahedron has associated therewith the aforementioned exchangeable cation. In most cases, at least a portion of the exchangeable cations are subsequently ionexchanged with hydrogen cations and/or other cations to yield a catalytically active form of the crystalline aluminosilicate.

The $SiO_4$ and $AlO_4$ tetrahedra are arranged in a definite geometric pattern often visualized in terms of chains, layers or polyhedra, all formed by the linking of the fundamental tetrahedra units. In any case, the effect is a network of cages or cavities interconnected by intracrystalline pores and channels whose narrowest cross-sections have essentially a uniform diamter. The various crystalline aluminosilicates may be classified by the geometric pattern of their framework with its attendent pore size, and by the silica-alumina mole ratio of which they are composed.

Methods of synthesizing the various crystalline aluminosilicates are well-known. Generally, a reaction mixture is prepared comprising sodium hydroxide in aqueous solution, sodium aluminate, or other suitable alumina precursor, and sodium silicate or other suitable silicate source including colloidal silica. The reaction conditions, as well as the mole ratio of the reactants, are carefully controlled to precipitate a particular crystalline aluminosilicate product. Typically, the reaction mixture is allowed to digest at ambient temperature for up to about 40 hours or more after which it is heated with stirring at a temperature of from about 180° to about 250°F. The mother liquor, comprising residual alkali metal silicate, is then filtered or decanted from the crystalline aluminosilicates solids product which is thereafter washed, dried and recovered as finely divided particles in the 0.05–0.5 micron range.

The crystalline aluminosilicate commingled with the partial hydrolysis product is preferably a synthetically prepared X or Y type crystalline aluminosilicate, or a naturally occurring faujasite. The preferred materials are characterized by basically similar crystal lattice structures. Thus, the aforementioned fundamental structural units, $SiO_4$ and $AlO_4$ tetrahedra are joined to form four-membered and six-membered rings and the rings are so arranged that the resulting structure resembles a truncated octahedron with the four-membered rings forming six sides or faces thereof and the six-membered rings forming the remaining eight sides or faces. The resulting truncated octahedra are interconnected at the hexagonal faces through a hexagonal prism formed by two of the sin-membered rings of tetrahedra to from a crystal lattice comprising cavities or cages in open communication through channels permitting three-directional access thereto. In general, the preferred crystalline aluminosilicates are characterized by a $SiO_2/Al_2O_3$ ratio of from about 2 to about 6 and by pore openings in the range of from about 6 to about 15 Angstroms, the synthetically prepared X type having a $SiO_2/Al_2O_3$ ratio of from about 2 to about 3, and the Y type having a $SiO_2/Al_2O_3$ ratio in excess of about 3. The preferred crystalline aluminosilicates may be prepared according to well-known methods such as are set out in U.S. Pat. No. 2,882,244 and U.S. Pat. No. 3,130,007.

In accordance with one preferred embodiment of this invention, the crystalline aluminosilicate is a base-exchanged crystalline aluminosilicate comprising cations selected from the group consisting of magnesium, calcium, barium, cerium, lanthanum, praseodymium, neodymium, illinium, samarium, europium, gadolinium, terbium, dysprosium, holmium, erbium, thulium, scandium, yttrium, lutecium, and/or hydrogen cations. The crystalline aluminosilicate is preferably a rare earth-exchanged crystalline aluminosilicate, the crystalline aluminosilicate containing sufficient rare earth cations to yield a final cataylst containing from about 1.0 to about 10 wt. % rare earth metals.

In any case, the aluminum sulfate is thereafter completely hydrolyzed at an alkaline pH, as by the further addition of ammonium hydroxide thereto. The resulting solids product is advantageously aged in its mother liquor for a period of from about 2 to about 20 hours at a temperature of from about 85° to about 300°F. The aging process has been found to be particularly advantageous when the crystalline aluminosilicate alumina product of this invention is further impregnated with a metal of Group VIB and/or a metal of Group VIII for use as a hydrocracking catalyst of improved activity.

The solids product thus produced is separated from the reaction mixture, suitably by filtration, water-washed and dried. One convenient method comprises recovering the solids product as a filter cake which is then reslurried in water to a smooth consistency and subjected to spray drying. Thus, the aqueous slurry is sprayed in an atomized state into an atmosphere of hot inert gases to effect a rapid evaporation of moisture so that the dried particles of predetermined size range fall out of the spray. If so desired, the aforesaid filter cake can be water-washed to concentrate and partially remove soluble matter prior to spray-drying. Alternatively, the spray-dried material can be reslurried and subjected to one or more water-washings to reduce the soluble matter to an acceptable level.

The spray-dried solids product has superior pilling and flow characteristics attributed to moisture content and particle size distribution. The spray-dried particles may be introduced directly to a pilling machine without extraneous lubricant or binder. The pilling machines are suitably ajusted to produce pellets of about 2 to about 20 pounds crushing strength, although from about 5 to about 10 pounds is sufficient to permit handling and use in a commercial operation while retaining a porous structure conducive to high surface area for catalytic purposes.

Alternatively, the spray-dried solids product may be commingled with a temporary binder such as polyvinyl alcohol, starch or Sterotex in quantities of from about 1 to about 10 wt. %. The temporary binder is a useful aid in pilling in commercial production where spray-drying conditions are not as carefully controlled. The spray-dried particles containing temporary binder are formed into particles of desired size and shape by methods such as pilling, extrusion, etc. Upon subsequent calcination, preferably at a temperature of from about 800° to about 1200°F. in an air atmosphere, the temporary binder is burned from the shaped particles.

In the further preparation of the catalyst of this invention, the aforesaid alumina-crystalline aluminosilicate composite is impregnated with a metal of Group VIB and/or a metal of Group VIII. Of the Group VIB metals, for example chromium, molybdenum and tungsten, molybdenum is preferred. Of the Group VIII metals, for example, iron, nickel, cobalt platinum, palladium, ruthenium, rhodium, osmium, and iridium, nickel or cobalt is preferred. In general, the Group VIB metal will comprise from about 6 to about 20 wt. % of the final catalyst product, and the Group VIII metal from about 0.1 to about 10 wt. % thereof. The selected metal or metals can be composited with the alumina-crystalline aluminosilicate composite in any conventional or otherwise convenient manner. For example, said composite can be soaked, dipped, suspended or otherwise immersed in a solution of a suitable compound of one or more metals of Groups VIB and VIII. Alternatively, the metals can be composited with said composite utilizing individual solutions thereof and in any convenient sequence. Suitable compounds of metals of Groups VIB and VIII include ammonium molybdate, ammonium paramolybdate, molybdic acid, molybdenum trioxide, ammonium chromate, ammonium peroxychromate, chromium acetate, chromous chloride, chromium nitrate, ammonium metatungstate, tungstic acid, nickel nitrate, nickel sulfate, nickel chloride, nickel bromide, nickel fluoride, nickel idoide, nickel acetate, nickel formate, cobaltous nitrate, cobaltous sulfate, cobaltous fluoride, ferric chloride, ferric bromide, ferric fluoride, ferric nitrate, ferric sulfate, ferrice formate, ferric acetate, platinum chloride, chloroplatinic acid, chloropalladic acid, palladium chloride, and the like. The final catalytic composite after all of the components are present therein is usually dried for a period of from about 2 to about 8 hours or more in a steam dryer and subsequently oxidized in an oxygen-containing atmosphere, such as air, at an elevated temperature of from about 1100° to about 1700°F. for a period of from about 1 to about 8 hours or more. Following this high temperature oxidation procedure, the catalyst may be reduced for a period ranging from about ½ to about 1 hour at a temperature in the range of from about 700° to about 1000°F. in the presence of hydrogen. The catalyst is frequently improved when further subjected to a presulfiding technique designed to incorporate from about 0.05 to about 0.5 wt. % sulfur. This presulfiding treatment takes place in the presence of hydrogen and a suitable sulfur-containing compound such as hydrogen sulfide, carbon disulfide, and the like. This technique involves treating the reduced catalyst with a sulfiding gas, such as a mixture of hydrogen and hydrogen sulfide containing about 10 moles of hydrogen per mole of hydrogen sulfide, at conditions sufficient to effect the desired degree of sulfidation. These conditions include a temperature in the 50°–1100°F. range, and preferably a substantially water-free atmosphere.

The following examples are presented in illustration of a process of this invention and are not intended as an undue limitation on the generally broad scope of the invention as set out in the appended claims.

EXAMPLE I

About 3000 grams of a hydrated aluminum sulfate containing the equivalent of 500 grams of alumina was dissolved in 3700 cc of water and the resulting solution admixed with an aqueous ammonia solution. The aluminum sulfate solution was treated in 1250 cc batches with 306 cc of 28% aqueous ammonia solution being added to each batch with vigorous stirring. The product was a clear solution with a pH of about 4.1. About 570 grams of a finely divided, rare-earth exchanged, Type Y crystalline alumino silicate was dispersed in the vigorously stirred solution, and the stirring was continued for 1 hour. Thereafter, the pH was adjusted to 8.5 by the addition of 1200 cc of a 15% aqueous ammonia solution, and an additional 2000 cc of water was added to fluidize the mixture. The mixture was stirred for 2½hours at ambient temperature and then further aged at 203°F. for about 10 hours. The aged slurry was filtered in a Buchner funnel, washed with 3000 cc of hot water, and dried. The dried product was then further washed free of sulfate with an aqueous ammonia solution having a pH of about 8. The product was then redried at 300°F. for 4 hours.

EXAMPLE II

Approximately 250 grams of the dried product of the previous example was mulled with 20 grams of starch and 180 cc of water, and the resulting dough was extruded at 1000 psig. The extrudate was oven dried and calcined at 1022°F. for 3 hours. The calcined extrudate particles had an average bulk density of 0.54 grams per cubic centimeter. The dried particles (143 grams) were thereafter immersed in an aqueous solution (150 cc) containing 17.8 grams of nickelous nitrate, 38.03 grams of 85% molybdic acid and 18 cc of 28% aqueous ammonia solution, the solution being subsequently evaporated to dryness in contact with the extrudate particles in a rotary steam dryer. The final catalytic composite, upon drying and calcining at 1100°F. for 1 hour, analyzed 2 wt. % nickel and 12 wt. % molybdenum. The extrudate particles had an average bulk density of 0.69 grams per cubic centimeter.

EXAMPLE III

In this example, a catalytic composite was prepared by dry-mixing 500 grams of finely divided alumina with 570 grams of finely divided, rare earth-exchanged, Type Y crystalline aluminosilicate. This physical mixture was mulled with about 20 grams of starch and 180 cc of water, and the resulting dough was extruded at 1000 psig. The extrudate was calcined at 1022°F. for 3 hours, and thereafter impregnated with 2 wt. % nickel and 12 wt. % molybdenum as described in Example II. The catalytic composite in this instance was also calcined at 1100°F. for 1 hour.

EXAMPLE IV

About 110 cc of each of the catalysts of Examples II and III was reduced and sulfided by passing a 10:1 mole ratio of hydrogen and hydrogen sulfide over the catalyst at 775°F. for 3 hours at the rate of 1.5 cubic feet per hour. The reduced and sulfided catalyst was cooled and maintained in a dry nitrogen atmosphere. In each case, 100 cc of the catalyst was thereafter placed as a fixed bed in a vertical tubular reactor encased in a furnace. A Farmer's Union vacuum gas oil was processed over the catalyst at 1.0 liquid hourly space velocity admixed with 12,000 standard cubic feet of recycle hydrogen per barrel of hydrocarbon charge. The furnace temperature was maintained at 740°F. and the reactor pressure at 2000 psig. The vacuum gas oil charge stock had a 634°–1058°F. boiling range and contained 2.47 wt. % sulfur, 1400 ppm nitrogen, 54.4 volume % aromatics and 45.6 volume % paraffins and naphthenes. The hydrocracked product was in each case distilled, and the amount distilled over at 650°F. was determined as a measure of comparison.

The catalyst of Example II of this invention yielded a product 77.5% of which distilled over at 650°F. On the other hand, the catalyst of Example III, substantially the same as Example II except that the alumina and rare earth-exchanged crystalline aluminosilicate were prepared as a physical mixture, yielded a hydrocracked product at which only 19% distilled over at 650°F.

We claim as our invention:

1. A process for converting a hydrocarbon charge stock into lower boiling, normally liquid hydrocarbon products which comprises reacting said charge stock and hydrogen at hydrocracking conditions in contact with a catalytic composite of an alumina, a crystalline aluminosilicate zeolite, from about 6 to about 20 wt. % of a Group VIB metal component and from about 0.1 to about 10 wt. % of a Group VIII metal component, said catalytic composite being characterized by a method of preparation which comprises:

a. admixing ammonium hydroxide and aluminum sulfate in aqueous media in a mole ratio of about 4:1 to form a soluble aluminum sulfate partial hydrolysis product in which 2 of the 3 sulfate radicals have been replaced with hydroxyl radicals;
   b. commingling a crystalline aluminosilicate zeolite with the partial hydrolysis product;
   c. thereafter effecting complete hydrolysis of said aluminum sulfate in admixture with the zeolite;
   d. aging the resulting mixture for a period of at least about 2 hours;
   e. separating and washing the solids product free of soluble matter;
   f. impregnating the solids product with the aforesaid amounts of said Group VIB and Group VIII metal components; and
   g. calcining the resulting composite at a temperature of from about 1100° to about 1700°F.

2. The process of claim 1 further characterized in that said hydrocracking conditions include a temperature of from about 500° to about 1000°F., a pressure of from about 500 to about 3000 psig, a hydrocarbon charge rate of from about 0.25 to about 10 liquid hourly space velocity, and a hydrogen concentration of from about 2000 to about 15,000 standard cubic feet per barrel of hydrocarbon charge.

3. The process of claim 1 further characterized with respect to step (b) in that said crystalline aluminosilicate is a Type Y crystalline aluminosilicate.

4. The process of claim 1 further characterized with respect to step (b) in that said crystalline aluminosilicate is a rare earth-exchanged Type Y crystalline aluminosilicate.

5. The process of claim 1 further characterized with respect to step (b) in that said crystalline aluminosilicate is employed in an amount to provide from about 5 to about 95 wt. % of the final catalyst product.

6. The process of claim 1 further characterized with respect to step (d) in that said mixture is aged at a temperature of from about 85° to about 300°F. for a period of from about 2 to about 20 hours.

7. The process of claim 1 further characterized with respect to step (f) in that said Group VIB metal component is a molybdenum and said Group VIII metal component is a nickel component.

* * * * *